United States Patent
Ager et al.

[11] Patent Number: 6,159,258
[45] Date of Patent: Dec. 12, 2000

[54] AIR FILTER ELEMENTS WITH FOAM PRE-CLEANERS

[75] Inventors: David William Ager; James Michael Glazewski, both of Gastonia; Roland V. Lanier, Belmont, all of N.C.

[73] Assignee: Dana Corporation, Toledo, Ohio

[21] Appl. No.: 09/217,195

[22] Filed: Dec. 22, 1998

Related U.S. Application Data

[63] Continuation-in-part of application No. 09/201,089, Nov. 30, 1998, abandoned.

[51] Int. Cl.[7] .............................. B01D 46/00; B01D 50/00
[52] U.S. Cl. ................................. 55/318; 55/486; 55/488; 55/521; 55/524; 55/DIG. 42; 210/489; 210/490
[58] Field of Search .................................... 55/318, 385.2, 55/385.3, 482, 483, 521, 485–489, 502, 524, DIG. 42; 210/484, 489, 490

[56] References Cited

U.S. PATENT DOCUMENTS

| | | |
|---|---|---|
| 1,566,088 | 12/1925 | Greene . |
| 2,002,936 | 5/1935 | Davies . |
| 2,019,186 | 10/1935 | Kaiser . |
| 2,408,659 | 10/1946 | Lamb . |
| 2,423,741 | 7/1947 | Vokes et al. . |
| 2,966,960 | 1/1961 | Rochlin . |
| 3,144,315 | 8/1964 | Hunn . |
| 3,290,870 | 12/1966 | Jensen . |
| 3,552,553 | 1/1971 | Reading . |
| 3,710,562 | 1/1973 | McKenzie . |
| 3,766,629 | 10/1973 | Lechtenberg . |
| 3,861,894 | 1/1975 | Marsh . |
| 3,937,663 | 2/1976 | Bessiere . |
| 4,178,161 | 12/1979 | Rudner et al. . |
| 4,589,983 | 5/1986 | Wydevan . |
| 4,636,231 | 1/1987 | Thornton et al. . |
| 4,695,300 | 9/1987 | Takagi . |
| 4,701,197 | 10/1987 | Thornton et al. . |
| 4,878,930 | 11/1989 | Manniso et al. . |
| 5,002,597 | 3/1991 | Gielow et al. . |
| 5,114,448 | 5/1992 | Bartilson . |
| 5,225,014 | 7/1993 | Ogata et al. . |
| 5,288,298 | 2/1994 | Aston . |
| 5,415,676 | 5/1995 | Tokar et al. . |
| 5,681,630 | 10/1997 | Smick et al. . |
| 5,706,777 | 1/1998 | Schlessmann et al. . |
| 5,871,557 | 2/1999 | Tokar et al. . |

FOREIGN PATENT DOCUMENTS

| | | |
|---|---|---|
| 628813 | 10/1961 | Canada . |
| 72 25 224 | 11/1972 | Germany . |
| 2197802 | 6/1988 | United Kingdom . |
| 2287664 | 9/1995 | United Kingdom . |

*Primary Examiner*—Duane Smith
*Assistant Examiner*—Fred Prince
*Attorney, Agent, or Firm*—Millen, White, Zelano & Branigan

[57] ABSTRACT

Air filter elements with primary filter medias have foam pre-cleaners with an increased surface area provided by an upstream face which has peaks and valleys. In one embodiment, the peaks and valleys are defined by parallel ribs. If the filter element is a panel-type filter element having a pleated primary filter media, then, in accordance with one embodiment, the pre-cleaner is secured to the primary filter media by adhesive deposits on the peaks of the primary filter media. If the filter element is annular, the pre-cleaner is also annular and is slid axially over a perforated sleeve or screen on the primary filter media and held thereon by friction. By having the upstream surface of the foam pre-cleaner configured in peaks and valleys, the surface area of the upstream surface is increased substantially, which improves the capacity, efficiency and life of the filter element.

14 Claims, 10 Drawing Sheets

AIR FILTER ELEMENTS WITH FOAM PRE-CLEANERS

RELATED PATENT APPLICATION

This application is a continuation-in-part of U.S. patent application Ser. No. 09/201,089, filed Nov. 30, 1998, abandoned.

FIELD OF THE INVENTION

The present invention relates to air filter elements and, more particularly, the present invention relates to air filter elements with foam pre-cleaners.

BACKGROUND OF THE INVENTION

Automobiles, trucks, off-road equipment and engine driven machinery utilize air filters to remove air borne contaminants from engine intake air before the air is introduced for combustion. These filters are sealed in a housing to prevent air borne contaminants from bypassing the filter before the air enters directly into the engine. It is preferable that these filters be made with a filtration media that offers a combination of the highest level of filter efficiency possible, as well as the highest level of dirt holding capacity, which capacity is determinative of filter life.

One approach to significantly increasing filter capacity while marginally increasing efficiency is to add pre-cleaners. Pre-cleaners are currently made from either fibrous webs of textile media, polyester foam or poly-ether foam. To date, pre-cleaners have always had flat upstream faces which limits dirt carrying capacity and thus the life of the filter utilizing the pre-cleaner. This is because relatively large particles of dirt tend to clog the upstream face of the filter media, decreasing the efficiency of the filter media even when the primary filter is not clogged, due in part to the pre-cleaner removing the large particles. There is always a need to further increase the capacity of air filters so as to extend their efficiency and thereby extend their life because the result of even a slight increase in efficiency and filter life means that the fleets of vehicles and aggregate of machines utilizing an improvement contributes to cleaner air and lower fuel consumption generally. Such improvements, when combined with other improvements in reducing air pollution and fuel consumption, have a very large, positive effect on the environment and thus improve life quality.

SUMMARY OF THE INVENTION

It is a feature of the present invention to provide a new and improved arrangement for increasing the capacity of air filters.

In view of this feature and other features, the present invention is directed to an air filter element having a primary filter media and a pre-cleaner wherein the pre-cleaner is made of foam and has an upstream face with peaks and valleys so as to increase the surface area thereof.

In a more specific aspect, the upstream face is formed with ribs defining peaks and valleys and in still a further aspect of the invention, the ribs are parallel.

In still a further aspect of the invention, the pre-cleaner is rectangular with a downstream side which is flat and in still a further aspect of the invention, the pre-cleaner is cylindrical with a downstream side that is of a constant radius and an upstream side which has peaks and valleys to increase the surface of the upstream side.

In another aspect of the invention, the primary filter media is a pleated filter media with peaks and valleys having an upstream side, which upstream side faces the downstream side of the pre-cleaner.

In still a further aspect of the invention, the pre-cleaner has a downstream side with a flat surface which engages peaks at the upstream side of the primary filter media and is adhered to the primary filter media at the peaks.

In a further aspect of the invention, the primary filter media and pre-cleaner are both cylindrical with the pre-cleaner sliding over the primary filter media and being retained on the filter element by a friction fit.

In still a further aspect of the invention, the primary filter media and pre-cleaner are both circular.

BRIEF DESCRIPTION OF THE DRAWINGS

Various other features and attendant advantages of the present invention will be more fully appreciated as the same becomes better understood when considered in conjunction with the accompanying drawings, in which like reference characters designate the same or similar parts throughout the several views, and wherein.

DETAILED DESCRIPTION

The First Embodiment: FIGS. 1–6

Figure 1:
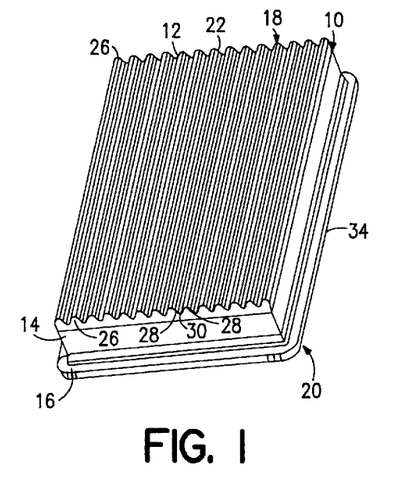
FIG. 1 is a perspective view of an air filter configured in accordance with the principles of the present invention.

Referring now to FIGS. 1–6, there is shown a first embodiment of a filter element 10 configured in accordance with the principles of the present invention. As is seen in FIG. 1, the filter element 10 is a panel-type filter element comprised of a foam pre-cleaner 12 and a primary filter 14 with a gasket 16 which seals in the housing in which the filter is mounted. The foam pre-cleaner 12 is mounted on the "dirty" side 18 of the filter element 10 while the gasket 16 is adjacent to the "clean" side 20 of the filter element. The foam pre-cleaner 12 has an upstream side 22 which has a surface 24 defined by a plurality of ribs 26 that define peaks 28 and valleys 30. By arranging the pre-cleaner with the ribs 26, the surface area 24 of the upstream side of the pre-cleaner is substantially increased. The pre-cleaner 12 therefore holds an increased quantity of relatively coarse dirt particles so as to prevent those particles from filling the primary filter media 14 which traps smaller particles that pass through the pre-cleaner 12. Preferably, the foam pre-cleaner 12 is made of polyester foam or poly-ether foam.

Figure 2:
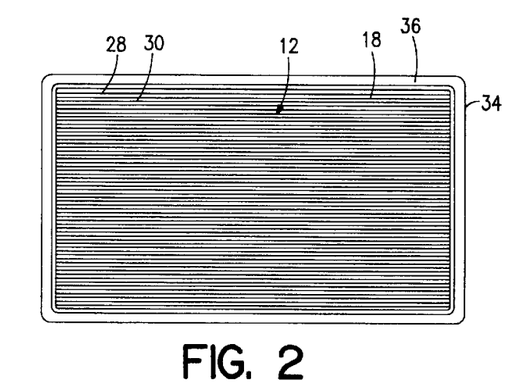
FIG. 2 is a front view of the air filter of FIG. 1.
Figure 3:
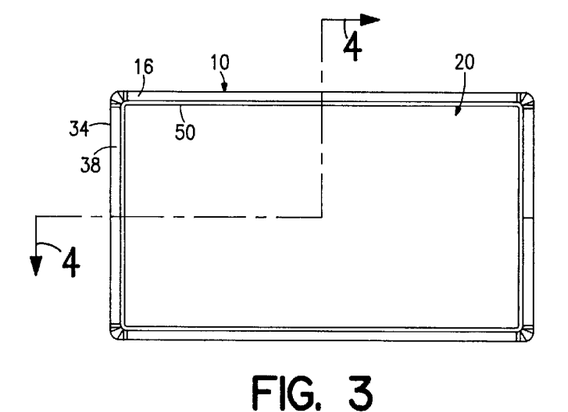
FIG. 3 is a rear view of the air filter of FIG. 1.
Figure 4:
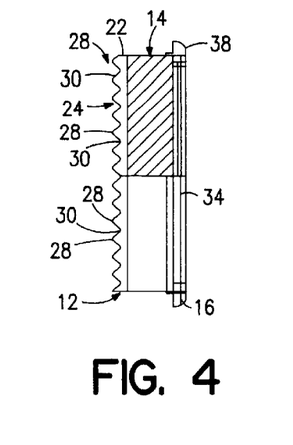
FIG. 4 is a side elevation taken along lines 4—4 of FIG. 3.

As is best seen in FIGS. 2–4, the gasket 16 which is disposed adjacent the downstream side 20 of the filter element 10 seals with a housing (not shown) which receives the filter element. The gasket 16 includes a flat side 36 and a rounded side 38, with the rounded side facing downstream and the flat side facing upstream or toward the pre-cleaner 12.

In a preferred embodiment, the primary filter media 14 is a pleated filter media having pleats 39 with peaks 40 and valleys 42 separated by gaps 44. Accordingly, it is necessary to seal the primary filter media 14 at the downstream side 20 of the filter element 10. This is accomplished by a peripheral bead of sealing material 50 which is unitary with the gasket 16 and extends a short distance over the sides of the primary filter media 14.

Figure 5:
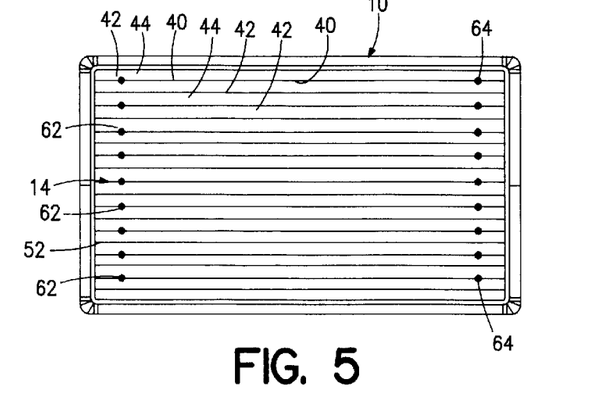
FIG. 5 is a view of an upstream face of a primary filter of FIG. 1.

Referring now to FIG. 5, the primary filter media 14 has an upstream side 53 which defines an undulating surface defined by the peaks 40 and valleys 42. The peaks 40 lie substantially in a plane 52 which defines a planar area. In accordance with one embodiment of the invention, when FIG. 2 is considered in conjunction with FIGS. 3 and 5, it is seen that the peaks and valleys 40 and 42 of the primary filter media 14 extend perpendicularly to the peaks and valleys 28 and 30 of the pre-cleaner 12. While the peaks and valleys 40 and 42 are preferably perpendicular with the peaks 40 and valleys 42 of the primary filter media 14, in other non-preferred embodiments, they may extend parallel to one another or at any angle. In accordance with another embodiment of the invention, the peaks and valleys 40 and 42 of the primary filter media 14 extend parallel to the peaks and valleys of the pre-cleaner 12.

Figure 6:
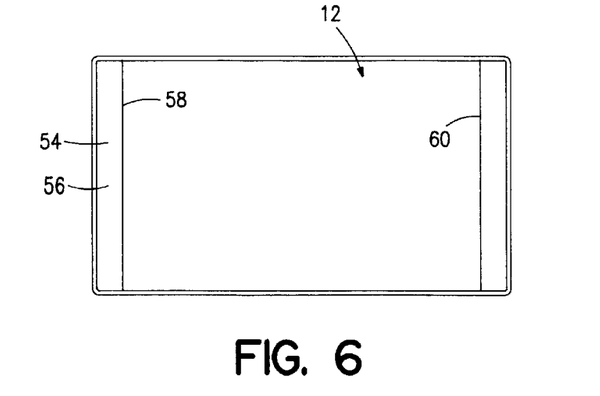
FIG. 6 is a view of a downstream face of a pre-cleaner used with the primary filter of FIG. 1.
Figure 7:
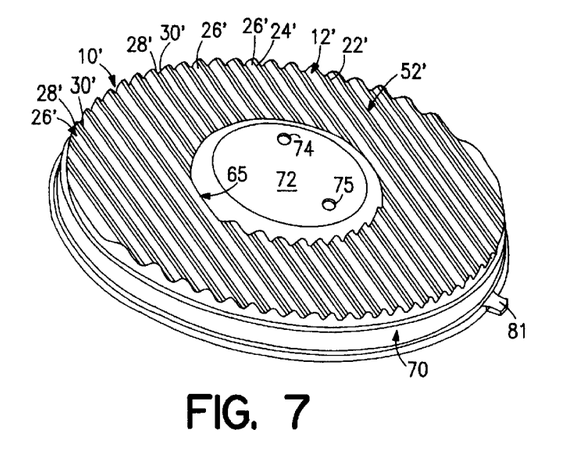
FIG. 7 is a perspective view of an air filter element according to a second embodiment of the present invention.
Figure 8:
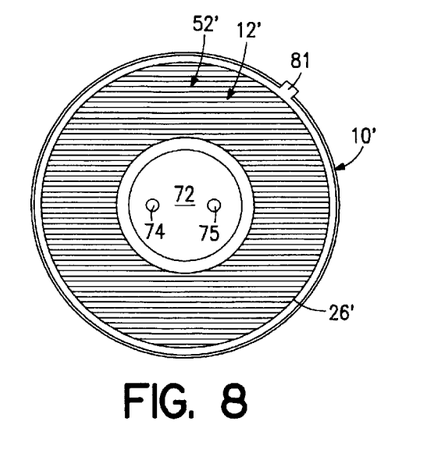
FIG. 8 is a front view of the air filter of FIG. 7.

As is seen in FIG. 6, pre-cleaner 12 has a downstream side 54 defined by a rear surface 56. In accordance with one approach, prior to mounting the pre-cleaner 12 on the primary filter 14, two spaced parallel beads of adhesive 58 and 60 are deposited on the rear face 56 of the pre-cleaner 12. When the rear face 56 of the cleaner 12 is placed on the upstream side 53 of the primary filter media 12, the beads of adhesive 58 and 60 have substantially point contact at limited locations 62 and 64 on the peaks 40 of the pre-cleaner media 14 so that there is limited interference by the adhesive beads 58 and 60 with flow through primary filter media.

Alternatively, the adhesive is applied only to the peaks 40 of the pleats 39 of the primary filter media 14 at limited locations 62 and 64 which have limited lateral extent. The rear surface 56 of the pre-cleaner 12 is then pressed against the pleats 39 so that the pre-cleaner is bonded at spaced locations to the primary filter media 14.

A typical filter 10 for an internal combustion engine for a vehicle may be, for example, about 13 inches long and about 6 inches wide.

Typically, the foam pre-cleaner is polyester foam with a pore density of about 40 pores/inch$^2$ having a base thickness of about 0.200 inch with ribs 26 having a height of about 0.125 inch for a total thickness of about 0.325 inch. In another example, the foam pre-cleaner 12 is made of polyester foam having a pore density of 60 pore/inch$^2$, a base thickness of about 0.125 inch and a rib height of about 0.125 inch for a total thickness of about 0.250 inch.

The Second Embodiment: FIGS. 7–16

Figure 11:
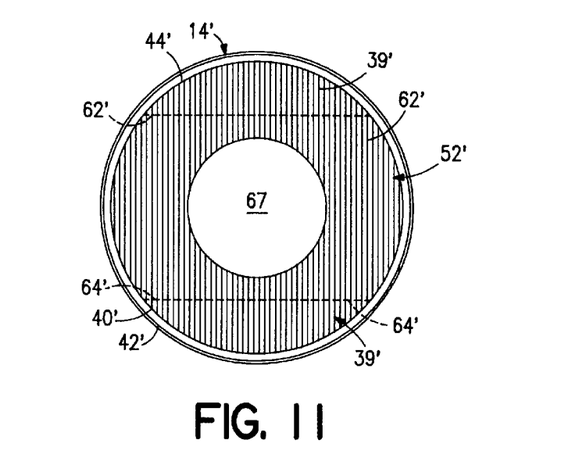
FIG. 11 is a view of the upstream face of a pleated filter media used in the air filter of FIG. 7 wherein the pleats extend parallel with respect to one another.
Figure 12:
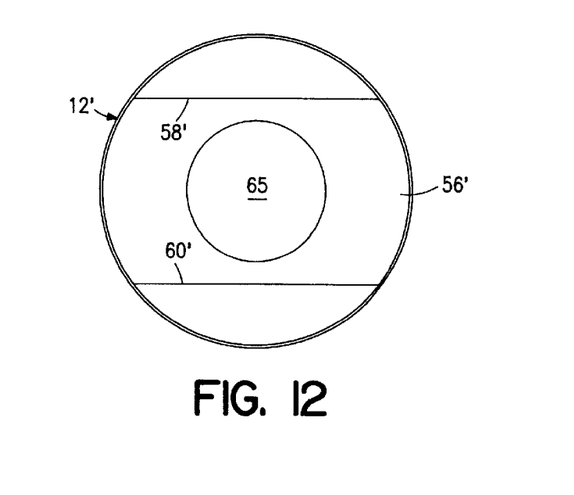
FIG. 12 is a planar rear view of a pre-cleaner used with the primary filter of FIG. 11.

The second embodiment is a filter element 10' in which the pre-cleaner 12' is circular rather than rectangular and includes a central opening 65 (see FIG. 12). The primary filter media 14' is also circular with a central opening 67 (see for example FIG. 11). The pre-cleaner 12' is made of a foam material, such as polyester foam, and includes peaks 28' and valleys 30' which are arranged in a parallel array of ribs 26'. The primary filter 14' may or may not be a pleated filter media, but, in any event, is fabricated to stop small, air borne particles while the pre-cleaner 12' traps coarse, air borne particles. The primary filter 14', if not a pleated filter media, may be a mat of polyester fibers.

As is seen in FIGS. 11 and 12, if the filter media 14' is a pleated filter media, then the peaks and valleys 40' and 42' extend parallel to one another in a first direction to define a substantially planar area 52' against which the rear surface 56' of the pre-cleaner 12' abuts. Like the arrangement of the first embodiment, the pre-cleaner 12' may have two parallel lines of adhesive 58' and 60' which engage the peaks 40' of the primary filter to adhere the pre-cleaner to the primary filter. For purposes of illustration in the second embodiment, the peaks and valleys 40' and 42' and the peaks 28' and valleys 30' extend perpendicular to one another. However, the peaks and valleys of the pre-cleaner 12' and primary filter media 14' could extend perpendicular to one another.

Figure 9:
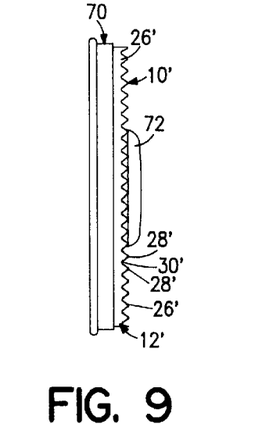
FIG. 9 is a side view of the air filter of FIG. 7.
Figure 10:
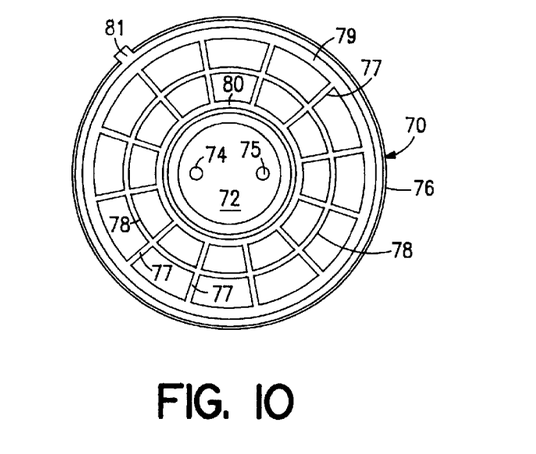
FIG. 10 is a rear view of the air filter of FIG. 7.

As is best seen in FIGS. 9 and 10, the assembly of the pre-cleaner 12' and the primary filter 14' is mounted on a frame 70. The frame 70 includes a central hub 72 which projects through the central openings 65 in the pre-cleaner 12' and 67 in the primary filter media 14'. The hub 72 includes a pair of spaced holes 74 and 75 which receive mounting screws to secure the filter element 10' in a housing (not shown). As is seen in FIG. 10, the frame 70 includes a grid defined by rim 76 which is joined to the hub 72 by a series of radial spokes 77. To support the primary filter 14', the spokes 77 are strengthened by intermediate struts 78, which cooperate with the spokes, an outer peripheral land 79 and an inner peripheral land 80 adjacent to the hub 72. A tab 81 projects radially from the rim 76 to facilitate mounting the filter 10' in its housing (not shown).

The filter element 10', which is the second embodiment of the invention, functions substantially the same as the filter element 10 of the first embodiment of the invention, wherein the ribs 28' and valleys 30' provide an increased surface area for the pre-cleaner 12'. As air is drawn through the filter element 10', it presses pre-cleaner 12' against the primary filter 14' and the primary filter 14' against the grid defined provided by the spokes 77, struts 78 and peripheral lands 79 and 80 of the frame 70.

Figure 13:
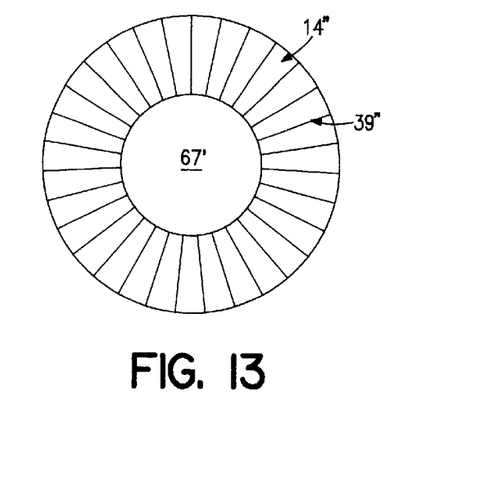
FIG. 13 is a planar view of the upstream face of an alternative pleat configuration for the primary filter media used in the air filter element of FIG. 7 wherein the pleats extend radially.

Referring now to FIG. 13, there is shown a variation 14" of the primary filter media wherein pleats 39" extend radially from the center opening 67'. As with the arrangement of FIG. 11, the pleats 39" support the pre-cleaner 12'.

Figure 14:
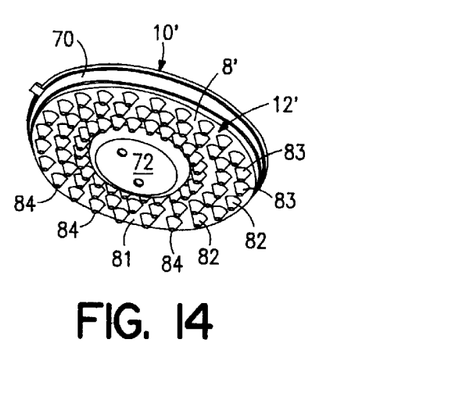
FIG. 14 is a planar view of the upstream face of the pre-cleaner of the type shown in FIG. 7 wherein the peaks are projections having minimal lateral extent.
Figure 15:
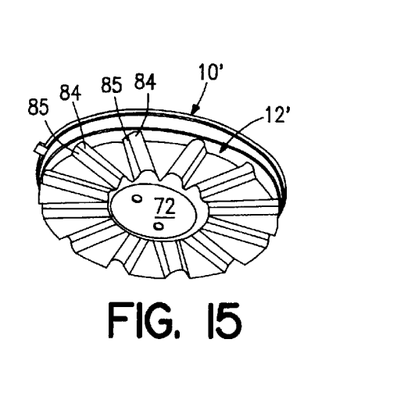
FIG. 15 is a planar view of the upstream face of the pre-cleaner of the type shown in FIG. 7 wherein the peaks and valleys extend radially.
Figure 16:
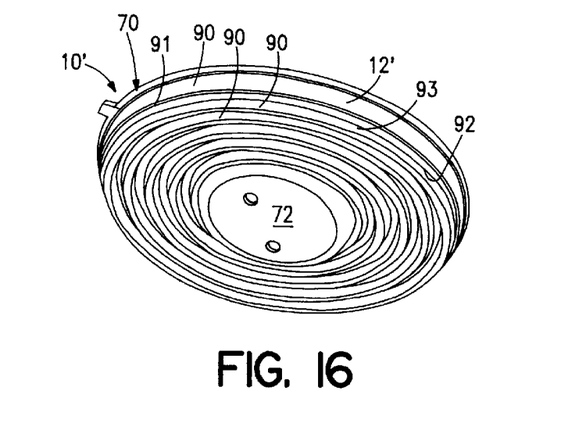
FIG. 16 is a planar view of the upstream face of the pre-cleaner of the type shown in FIG. 7 wherein the peaks and valleys are formed by concentric circular ribs.
Figure 17:
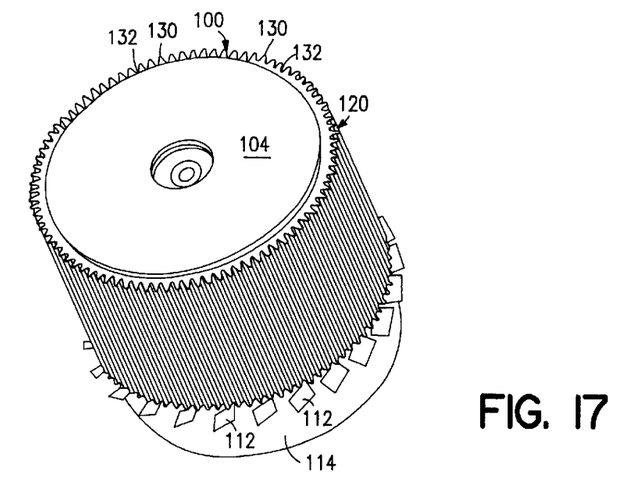
FIG. 17 is a perspective view, with portions broken away, of a third embodiment of a filter element in accordance with the present invention.
Figure 18:
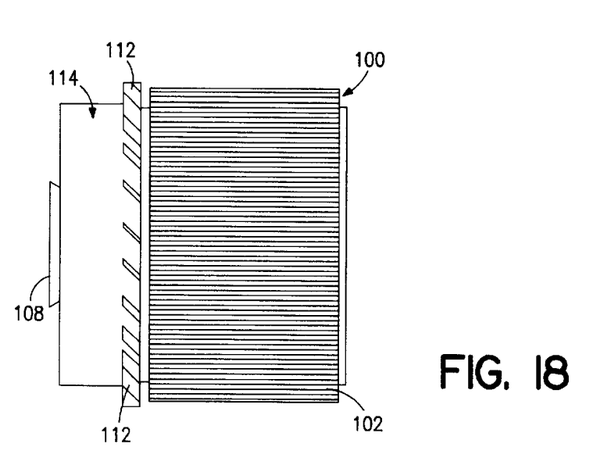
FIG. 18 is a side view of the filter element of FIG. 17.
Figure 19:
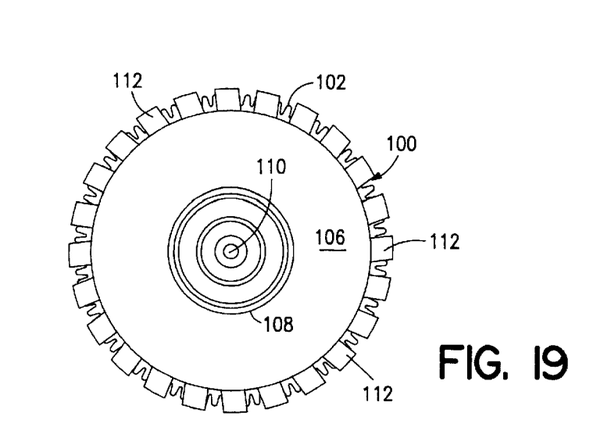
FIG. 19 is a planar view of a first end of the filter element of FIG. 17.
Figure 20:
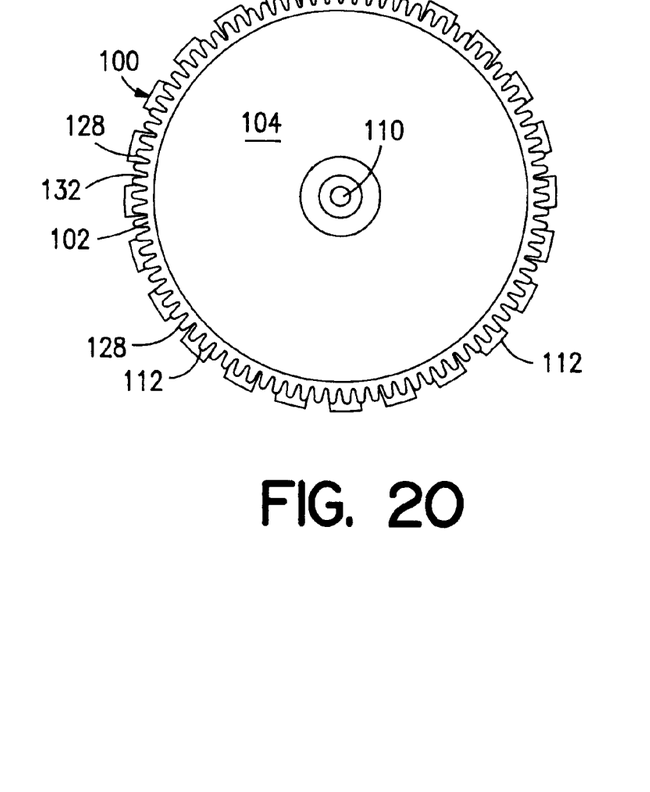
FIG. 20 is a planar view of a second end of the filter element of FIG. 17.

FIGS. 14–16 show variations of the pre-cleaner 12'. In FIG. 14, the pre-cleaner 12' has valleys 81 from which extend an array of conical projections 82 having surface areas 83 terminating in peaks 84, which surface areas 83 increase the upstream surface area of the pre-cleaner. In FIG. 15, the pre-cleaner 12' has radial grooves 84 with sloping sides 85 which increase upstream surface area. In FIG. 16, the pre-cleaner 12' has ribs 90 arranged in concentric circles so as to provide peaks 91 and valleys 92 having walls 93, which walls add upstream surface area to the pre-cleaner.

The Third Embodiment: FIGS. 17–23

In the third embodiment of the invention, a heavy duty air filter element 100 includes an annular, pleated primary filter media 102 (FIG. 21) having axially extending pleats 103. The primary filter media 102 is supported between a closed end plate 104 and an annular end plate 106 that has a central air outlet 108 therein through which clean air exits. The closed end plate 104 has a hole 110 therethrough which receives a mounting bolt which projects up through the air outlet 108 in the annular end plate 106 for mounting the filter element 100. In one variation, an array of canted fins 112 are disposed about a plastic fin supporting portion 114 of the filter element 100 to cause inlet air which enters the filter housing (not shown) supporting the air filter element 100 to rotate so as to precipitate out at least some of the dirt particles in the inlet air by centrifugal force.

Figure 21:
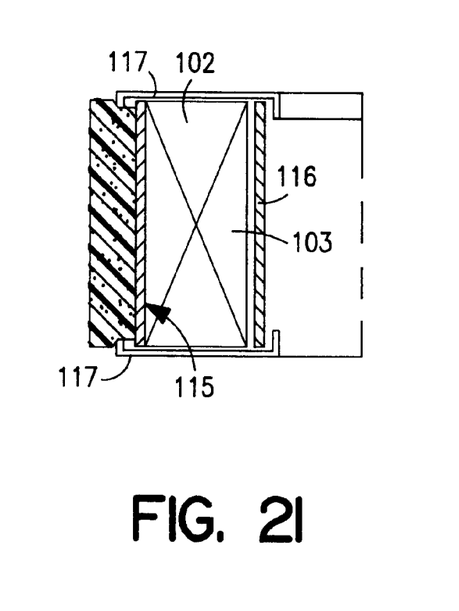
FIG. 21 is a side elevation of a portion of a cylindrical filter element of the type shown in FIG. 17.

As is seen in FIG. 21, the air filter element 100 includes an outer perforated support sleeve 115 and an inner perforated support sleeve 116 which sandwiches the primary filter media 102 therebetween. The perforated support sleeves 115 and 116 may be fabricated from expanded metal, preferably cold rolled steel. In the embodiment of FIG. 21, the axial ends of the primary filter media 102 are closed by end caps 117.

Figure 22:
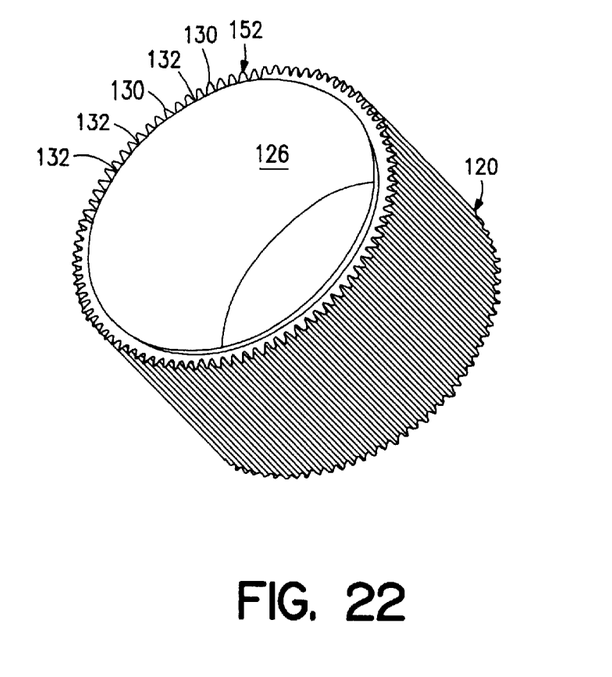
FIG. 22 is a perspective view of a cylindrical pre-cleaner with axially extending ribs used with the filter element of FIGS. 17–21.
Figure 23:
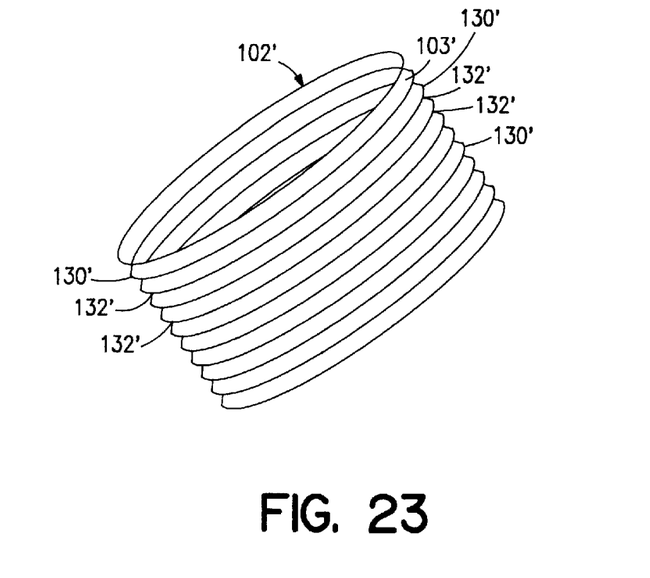
FIG. 23 is a perspective view of a pre-cleaner with radially extending ribs used with the filter elements of FIGS. 17–22.
Figure 24:
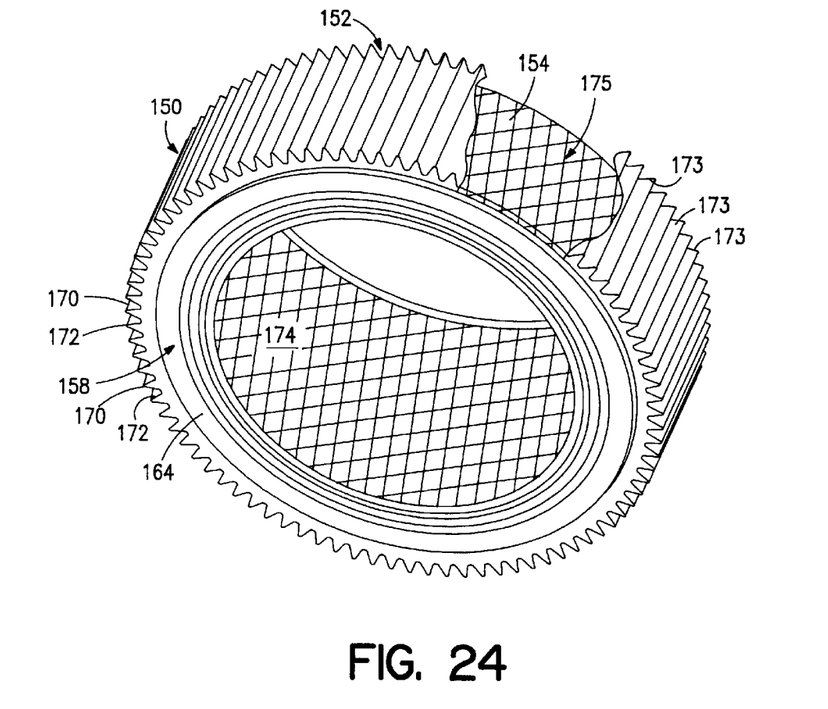
FIG. 24 is a perspective view, with portions broken away, of a fourth embodiment of the filter element in accordance with the present invention.

In accordance with the present invention, a pre-cleaner 120, configured as a tube (FIGS. 23 and 24), is slid over the outer sleeve 115 (FIGS. 17 and 21) in order to initially remove coarser particles from the air stream entering the filter element 100. The pre-cleaner 120 has a cylindrical, constant diameter downstream side 126 which engages the outer surface of the sleeve 115. In the embodiment of FIG. 22, the pre-cleaner 120 has peaks 130 and valleys 132 which extend axially with respect to the filter element 100 and define axially extending parallel ribs 133. In the variation of FIG. 23, the pre-cleaner 120' has ribs 133' which extend radially rather than axially. In both embodiments, the pre-cleaners 120 and 120' slide over the outer sleeve 115 and are retained on the filter element 100 by a friction fit requiring no adhesive. By so configuring the pre-cleaner 120, the surface area of the pre-cleaner is increased substantially, which, as with the first and second embodiments of the invention, increases the capacity of the pre-cleaner and thus extends the efficiency of the filter element 100, resulting in a longer life for the filter element.

Figure 25:
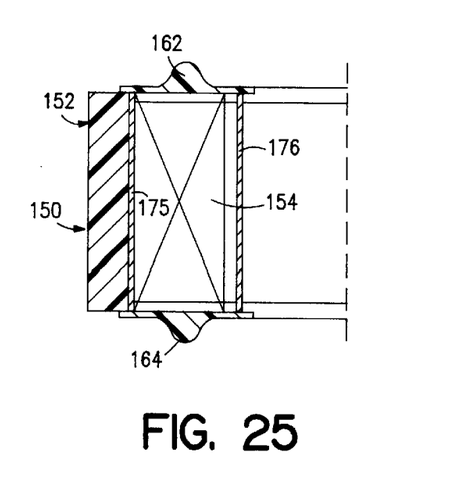
FIG. 25 is a side elevation of a portion of a cylindrical filter element of the type shown in FIG. 24.
Figure 26:
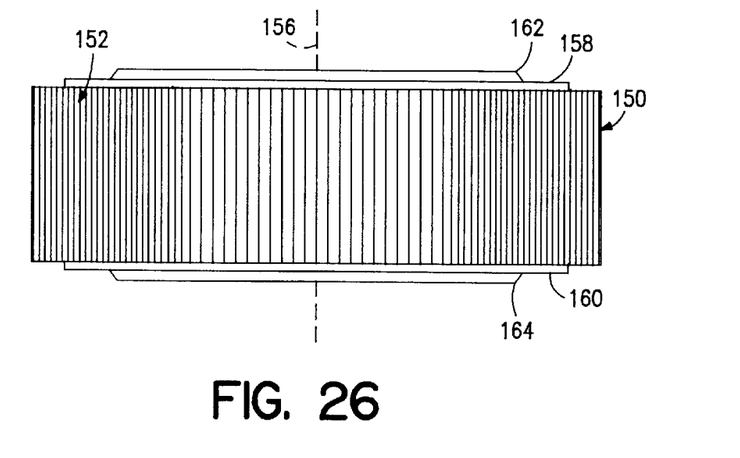
FIG. 26 is a side view of the filter element of FIG. 24.
Figure 27:
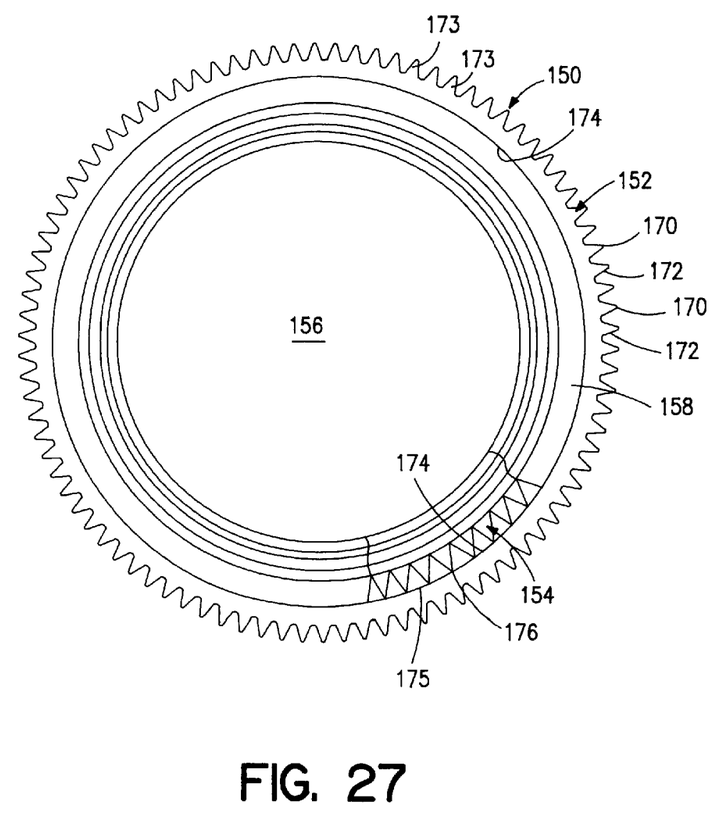
FIG. 27 is an end view of the filter element of FIG. 24.

The Fourth Embodiment: FIGS. 25–27

In FIGS. 25–27, an annular air filter 150 is shown. The annular air filter 150 includes an annular pre-cleaner 152 which is mounted around a pleated filter media 154 (FIG. 27) having pleats extending in the direction of an axis 156. Pleated filter media 154 has end surfaces closed by annular seals 158 and 160 which have gasket portions 162 and 164 extending therefrom to seal with a housing (not shown) in which the filter element 150 is mounted. The pre-cleaner 152 has peaks 170 and valleys 172 defining ribs 173 substantially similar to the peaks and valleys 130 and 132 of the pre-cleaner 120 shown in FIGS. 17, 18 and 22. Like the pre-cleaner 120, the pre-cleaner 152 has a constant radius, downstream cylindrical surface 174 which engages an outer perforated sleeve 175 fitted around the pleated filter media 154. A second perforated sleeve 176 is disposed adjacent the downstream surface 177 of the filter media 154. As with the pre-cleaner 120 of filter element 100 (FIGS. 17–23), it is not necessary to use an adhesive to hold the pre-cleaner 152 on the perforated sleeve 175 because a friction fit suffices. However, if for some reason an adhesive or other positive attachment is necessary for a particular application, an adhesive or other positive attachment may be employed. Again, the peaks and valleys 170 and 172 provide ribs 173 which substantially increase the upstream surface area of the pre-cleaner 152, thereby increasing its capacity and extending the efficiency of the filter element 150 which results in a longer life for the filter element.

From the foregoing description, one skilled in the art can easily ascertain the essential characteristics of this invention, and without departing from the spirit and scope thereof, can make various changes and modification of the invention to adapt it to various usages and conditions.

We claim:

1. An air filter comprising:
    a primary filter media, the primary filter media being pleated and having peaks and valleys disposed at an upstream side and a downstream side, respectively, the valleys at the downstream side defining a first filter face and the peaks at the upstream side lying in the same plane to define a second filter face; and
    a pre-cleaner made of foam material, the pre-cleaner having an upstream side and a downstream side, the upstream side having a surface defined by peaks and valleys and the downstream side having a planar rear side facing in the direction of the first filter face of the primary filter media, the pre-cleaner being mounted over the primary filter media with a rear surface thereof defining a downstream side facing and directly engaging only the peaks of the second filter face of the primary filter media.

2. The air filter of claim 1, wherein the planar area and rear surface are coincident.

3. The air filter of claim 2, wherein the pre-cleaner is attached to the primary filter by adhesive.

4. The air filter of claim 3, wherein the adhesive is disposed between the upstream side of the primary filter media and rear surface of the downstream side of the pre-cleaner.

5. The air filter of claim 4, wherein the primary filter media is a pleated air filter media having peaks and valleys and wherein the adhesive is disposed on the peaks when the air filter is assembled.

6. The air filter of claim 5, wherein the adhesive is restricted to discrete locations on the peaks with limited longitudinal extent.

7. The air filter of claim 5, wherein the adhesive is disposed as lines on the rear face of the pre-cleaner.

8. The air filter of claim 7, wherein there are two lines of adhesive on the rear face of the pre-cleaner, the lines being spaced from one another.

9. The air filter of claim 1, wherein the peaks and valleys of the primary filter extend in a first direction and wherein the peaks and valleys of the pre-cleaner are arranged in parallel rows which extend perpendicular to the peaks and valleys of the primary filter.

10. The air filter of claim 1, wherein the peaks are on projections on the pre-cleaner which extend outwardly.

11. The air filter of claim 1, wherein the air filter is circular and the peaks and valleys of the pre-cleaner extend radially.

12. The air filter of claim 1, wherein the filter element is circular and the peaks and valleys of the pre-cleaner are formed by ribs arranged in concentric circles.

13. The air filter of claim 1, wherein the filter element is cylindrical and the peaks and valleys of the pre-cleaner extend radially.

14. The air filter of claim 1, wherein the filter element is rectangular and wherein the peaks and valleys of the pre-cleaner are formed by ribs which extend in parallel rows.

* * * * *